(12) United States Patent
Lee et al.

(10) Patent No.: US 8,442,683 B2
(45) Date of Patent: May 14, 2013

(54) CLEANING ROBOT AND CONTROL METHOD THEREOF

(75) Inventors: Yung-Shen Lee, Taipei (TW);
Shui-Shih Chen, Changhua County (TW)

(73) Assignee: MSI Computer (Shenzhen) Co., Ltd., Shenzhen City (CN)

( * ) Notice: Subject to any disclaimer, the term of this patent is extended or adjusted under 35 U.S.C. 154(b) by 182 days.

(21) Appl. No.: 13/109,216

(22) Filed: May 17, 2011

(65) Prior Publication Data

US 2012/0197437 A1    Aug. 2, 2012

(30) Foreign Application Priority Data

Jan. 28, 2011 (TW) ................................ 00103303 A

(51) Int. Cl.
     *G05B 15/00*     (2006.01)
     *G05B 19/04*     (2006.01)
     *A47L 5/00*      (2006.01)
     *A47L 11/00*     (2006.01)

(52) U.S. Cl.
     USPC ............ 700/258; 15/319; 15/21.1; 700/255

(58) Field of Classification Search ............ 700/255, 700/258; 15/21.1, 319
See application file for complete search history.

(56) References Cited

U.S. PATENT DOCUMENTS

| | | | |
|---|---|---|---|
| 7,031,805 B2 * | 4/2006 | Lee et al. ................. | 700/245 |
| 2010/0049365 A1 * | 2/2010 | Jones et al. .............. | 700/253 |
| 2012/0265346 A1 * | 10/2012 | Gilbert et al. ............ | 700/259 |

* cited by examiner

*Primary Examiner* — Khoi Tran
*Assistant Examiner* — Robert Nguyen
(74) *Attorney, Agent, or Firm* — Birch, Stewart, Kolasch & Birch, LLP

(57) ABSTRACT

A cleaning robot including a roller unit, a sensing unit, a first control unit and a second control unit is disclosed. The roller unit includes a plurality of rollers. The sensing unit receives a reflection signal and generates a detection signal according to the reflection signal. When the detection signal is less than or equal to a reference signal, the first control unit controls the traveling direction of the rollers according to the detection signal such that a distance between the cleaning robot and a wall is equal to a first distance. When the detection signal is larger than the reference signal, the second control unit controls the traveling direction of the rollers according to the detection signal such that a distance between the cleaning robot and a wall is equal to a second distance larger then the first distance.

11 Claims, 6 Drawing Sheets

CLEANING ROBOT AND CONTROL METHOD THEREOF

CROSS REFERENCE TO RELATED APPLICATIONS

This application claims priority of Taiwan Patent Application No. 100103303, filed on Jan. 28, 2011, the entirety of which is incorporated by reference herein.

BACKGROUND OF THE INVENTION

1. Field of the Invention

The invention relates to a cleaning robot, and more particularly to a cleaning robot changing traveling route according to distance between the cleaning robot and a wall.

2. Description of the Related Art

With technological development, the different types of electronic products have increased. A cleaning robot is one type of the electronic products. For a cleaning function, the cleaning robot moves along a wall and records a traveling route before formal cleaning. Then, the cleaning robot starts to clean and move according to the recorded results.

FIG. 1 is a schematic diagram of a conventional traveling route of a cleaning robot. Since the wall may comprise a concave opening 100, when the cleaning robot 110 moves along the wall, the cleaning robot cannot enter the concave opening 100 because the width of the concave opening 100 is less than the width of the cleaning robot 110. However, the cleaning robot 110 continuously attempts to enter the concave opening 100. Thus, cleaning efficiency of the cleaning robot 110 is reduced.

Additionally, a dock is generally disposed in a corner formed by two walls. When battery capacity of the cleaning robot is not sufficient, the cleaning robot can move along the wall to return to the dock. The dock charges the cleaning robot. However, the cleaning robot may enter every concave opening along the wall when the wall comprises various concave openings. Thus, the cleaning robot cannot immediately return to the dock.

BRIEF SUMMARY OF THE INVENTION

In accordance with an embodiment, a cleaning robot comprises a roller unit, a sensing unit, a first control unit and a second control unit. The roller unit comprises a plurality of rollers. The sensing unit receives a reflection signal and generates a detection signal according to the reflection signal. When the detection signal is less than or equal to a reference signal, the first control unit controls the traveling direction of the rollers according to the detection signal such that a distance between the cleaning robot and a wall is equal to a first distance. When the detection signal is larger than the reference signal, the second control unit controls the traveling direction of the rollers according to the detection signal such that a distance between the cleaning robot and a wall is equal to a second distance larger then the first distance.

A control method for controlling a cleaning robot is provided. The cleaning robot comprises a first control unit and a second control unit. A traveling route of the cleaning robot is controlled by the first and the second control units. An exemplary embodiment of the control method is described in the following. The cleaning robot is activated to receive a reflection signal. A detection signal is generated according to the reflection signal. When the detection signal is less than or equal to a reference signal, the first control unit is enabled such that the cleaning robot maintains a first distance with a wall. When the detection signal is larger than the reference signal, the second control unit is enabled such that the cleaning robot maintains a second distance with the wall, wherein the second distance is larger than the first distance.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
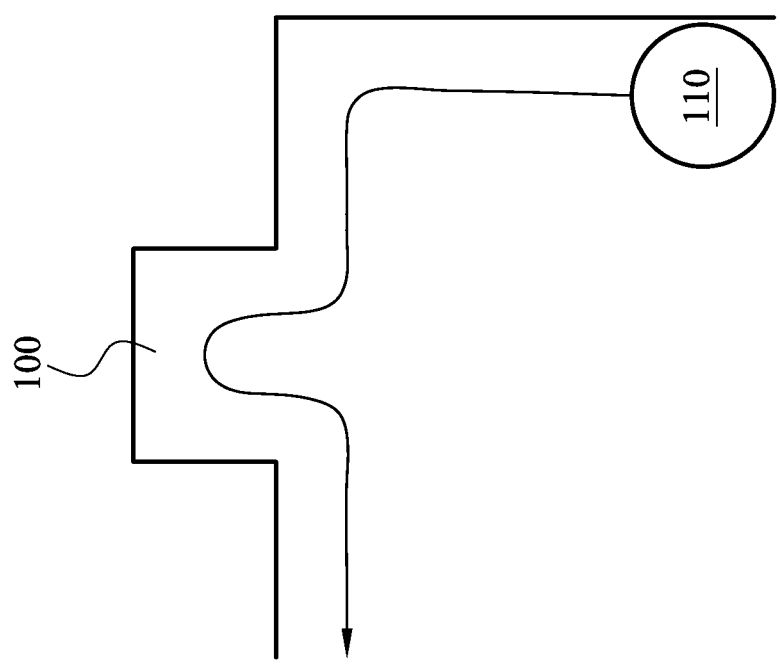
FIG. 1 is a schematic diagram of a conventional traveling route of a cleaning robot.
Figure 2:
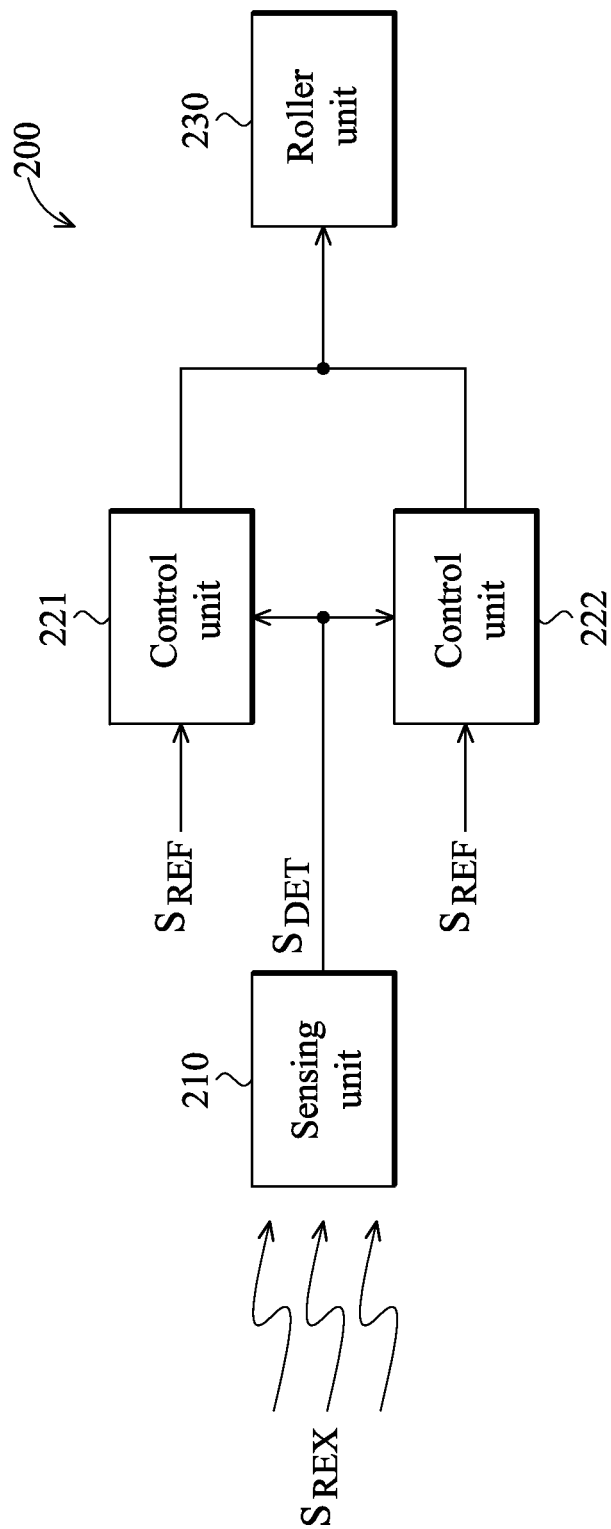
FIG. 2 is a schematic diagram of an exemplary embodiment of a cleaning robot.

FIG. 2 is a schematic diagram of an exemplary embodiment of a cleaning robot. The cleaning robot 200 comprises a sensing unit 210, control units 221, 222, and a roller unit 230. The roller unit 230 comprises a multitude of rollers. The cleaning robot 200 is capable of moving to any space by rolling the rollers.

The sensing unit 210 receives a reflection signal $S_{REX}$ and generates a detection signal $S_{DET}$ according to the reflection signal $S_{REX}$. The invention does not limit the kind of the sensing unit 210. In one embodiment, the sensing unit 210 comprises an ultrasonic wave receiver to receive ultrasonic wave, such as the reflection signal $S_{REX}$.

To adjust a distance between the cleaning robot 200 and a wall, the control units 221 and 222 control the roller unit 230 according to the detection signal $S_{DET}$. In this embodiment, the response speeds of the control units 221 and 222 are different in response to the detection signal $S_{DET}$.

For example, when the distance between the cleaning robot 200 and a wall is within a reference range, the control unit 221 immediately controls the roller unit 230 according to the detection signal $S_{DET}$. Since the response speed of the control unit 221 is fast, it can prevent the cleaning robot 200 from colliding with the wall.

Contrarily, when the distance between the cleaning robot 200 and a wall is not within the reference range, the control unit 222 does not immediately control the roller unit 230 according to the detection signal $S_{DET}$. Since the response speed of the control unit 221 is slow, the traveling route of the cleaning robot 200 is smooth and the cleaning robot 200 does not continuously move to a narrow interstice. Thus, the cleaning efficiency of the cleaning robot 200 is increased.

Figure 3A:
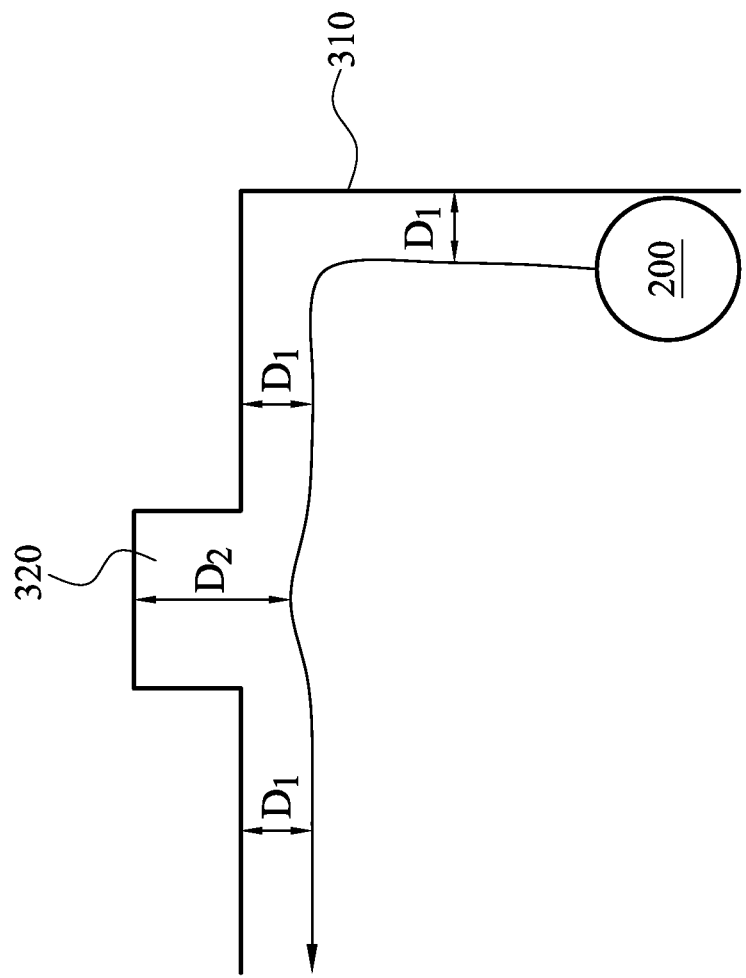
FIG. 3A is a schematic diagram of an exemplary embodiment of a traveling route of a cleaning robot of the invention.

FIG. 3A is a schematic diagram of an exemplary embodiment of a traveling route of the cleaning robot. When the wall 310 does not comprise a concave opening, the distance between the cleaning robot 200 and the wall 310 is less than a reference distance. Thus, the detection signal $S_{DET}$ is less than a reference signal $S_{REF}$ such that the control unit 221 immediately controls the roller unit 230 according to the detection signal $S_{DET}$. When the roller unit 23 is controlled by the control unit 221, the cleaning robot 200 maintains a first distance $D_1$ with the wall 310. In other words, the distance between the cleaning robot 200 and the wall 310 is equal to the first distance $D_1$.

When the detection signal $S_{DET}$ is larger than the reference signal $S_{REF}$, it represents that the wall 310 has a concave opening, such as the region 320. Thus, the roller unit 230 is controlled by the control unit 222. The control unit 222 controls the roller unit 230 according to the detection signal $S_{DET}$ such that the cleaning robot 200 maintains a second distance $D_2$ with the wall 310. In this embodiment, the second distance $D_2$ is larger than the first distance $D_1$.

In this embodiment, the response speed of the control unit 222 is slow in response to the changes in the wall. The invention does not limit the control method of the control unit 222. In one embodiment, the control unit 222 deactivates the detection signal $S_{DET}$ and controls the roller unit 230 according to the deactivated detection signal. Thus, the traveling direction of the rollers of the roller unit 230 is not substantially changed. In other embodiments, the control unit 222 delays the detection signal $S_{DET}$ and controls the roller unit 230 according to the delayed detection signal.

The invention does not limit the circuit structure of the control unit 222. In one embodiment, the control unit 222 comprises a proportional-integral-derivative (PID) controller, a phase lag controller, a fuzzy controller or a learning controller.

Additionally, in other embodiments, the control unit 222 comprises a filter (not shown). The filter filters high frequency components of the detection signal $S_{DET}$ to ignore the change in distance between the cleaning robot 200 and the wall 310. In this embodiment, the cut-off frequency of the filter relates to the width of the cleaning robot 200.

For example, assuming that traveling speed of the cleaning robot 200, which is moving along a wall, is 200 mm/s and the width of the cleaning robot 200 is about 320 mm. If it is undesired that the cleaning robot 200 enters a concave opening with a width of less than 320 mm, then the cut-off frequency of the filter is set to 0.625 Hz (fc=v/d=200/320).

The invention does not limit the kind of the filter. In one embodiment, the filter is an infinite impulse response (IIR) filter, a finite impulse response (FIR) filter, a Kalman filter or a particle filter.

When the cleaning robot 200 exits the region 320, the detection signal $S_{DET}$ is less than or equal to the reference signal $S_{REF}$. Thus, the roller unit 230 is controlled by the control unit 221.

Figure 3B:
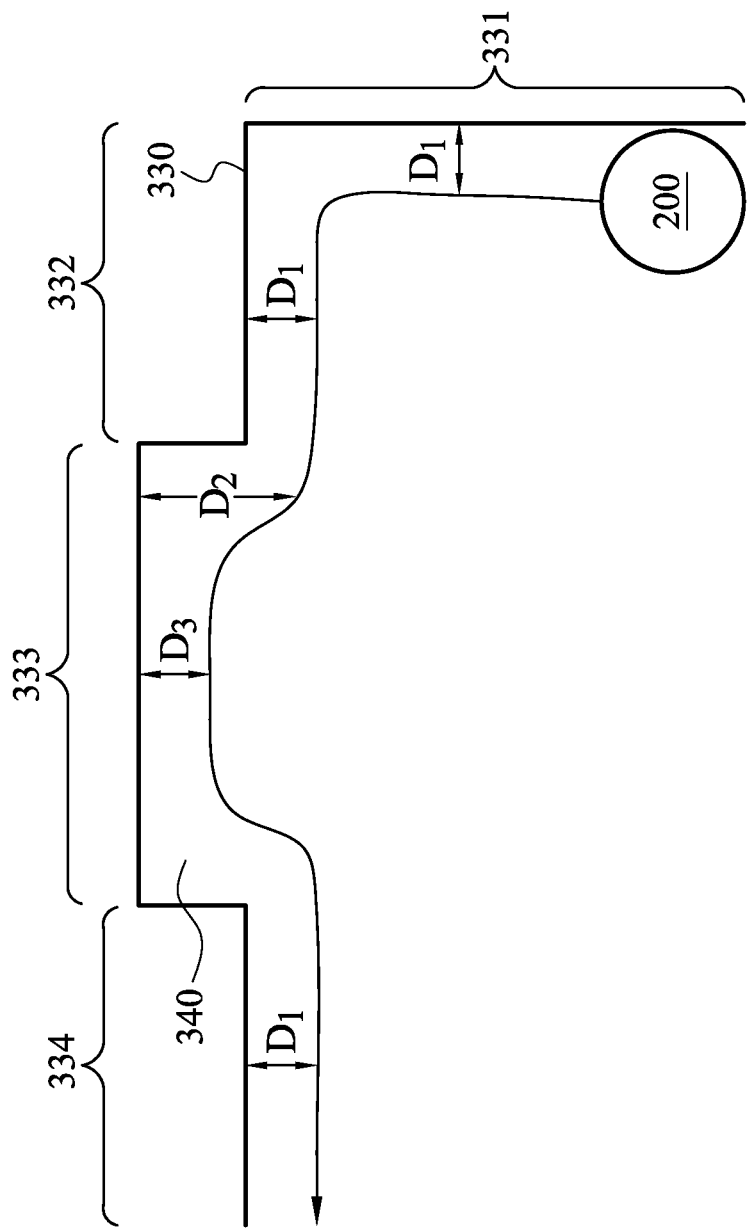
FIG. 3B is a schematic diagram of another exemplary embodiment of a traveling route of the cleaning robot of the invention.

FIG. 3B is a schematic diagram of another exemplary embodiment of a traveling route of the cleaning robot. When the cleaning robot 200 moves along a first portion 331 and a second portion 332 of the wall 330, the roller unit 230 is controlled by the control unit 221. At this time, the distance between the cleaning robot 200 and the wall 330 is equal to a first distance $D_1$.

When the cleaning robot 200 moves along a third portion 333 of the wall 330, since the third portion 333 comprises a concave opening 340, the detection signal $S_{DET}$ is larger than the reference signal $S_{REF}$. Thus, the roller unit 230 is controlled by the control unit 222. In this embodiment, the width of the concave opening 340 is larger than the width of the cleaning robot 200. Thus, the cleaning robot 200 enters the concave opening 340. In the concave opening 340, however, the distance between the cleaning robot 200 and the third portion 333 of the wall 330 is first equal to a second distance $D_2$ and then equal to a third distance $D_3$. In one embodiment, the third distance $D_3$ is equal to the first distance $D_1$. In other embodiments, the third distance $D_3$ is larger than the first distance $D_1$ and less than the second distance $D_2$.

When the cleaning robot 200 enters a fourth portion 334 of the wall 330, the detection signal $S_{DET}$ is less than or equal to the reference signal $S_{REF}$. Thus, the roller unit 230 is controlled by the control unit 221. At this time, the distance between the cleaning robot 200 and the wall is equal to the first distance $D_1$.

Figure 4B:
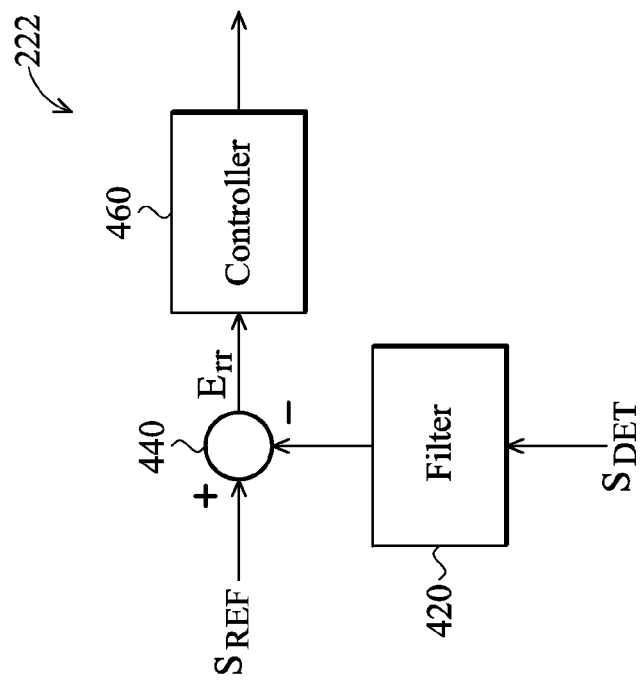
FIGS. 4A and 4B are schematic diagrams of other exemplary embodiments of control units of the invention.
Figure 4A:
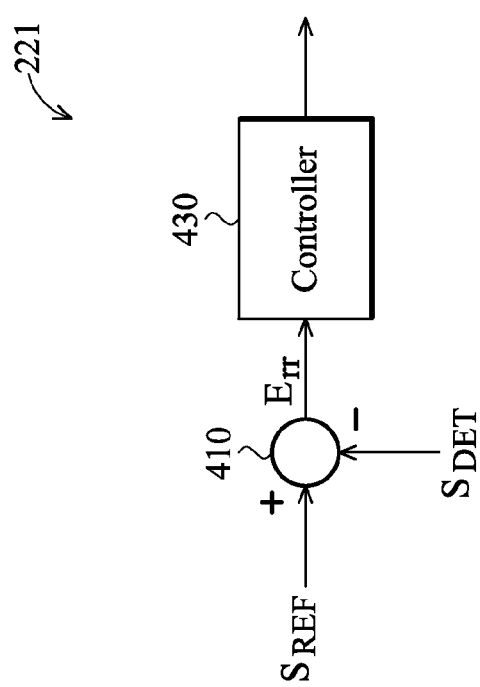

FIG. 4A is a schematic diagram of an exemplary embodiment of the control unit 210. The control unit 210 comprises a difference determining unit 410 and a controller 430. The difference determining unit 410 obtains a difference Err between the detection signal $S_{DET}$ and the reference signal $S_{REF}$. The controller 430 controls the roller unit 230 according to the difference Err. The invention does not limit the kind of the controller 430. For example, the controller 430 is a PID controller, a phase-lead controller or a learning controller.

FIG. 4B is a schematic diagram of an exemplary embodiment of the control unit 220. The control unit 220 comprises a filter 420, a difference determining unit 440 and a controller 460. The filter 420 filters the detection signal $S_{DET}$. In one embodiment, the filter 420 is a low-pass filter to filter the high frequency component of the detection signal $S_{DET}$.

The difference determining unit 440 obtains a difference Err between the detection signal $S_{DET}$ and the reference signal $S_{REF}$. The controller 460 controls the roller unit 230 according to the difference Err. In this embodiment, the controller 460 is a phase-lag controller to delay control for the roller unit 230.

In other embodiments, the filter 420 can be omitted. When the filter 420 is omitted, the difference determining unit 440 directly obtains the difference Err between the detection signal $S_{DET}$ and the reference signal $S_{REF}$. The controller 460 deactivates the difference Err such that the traveling direction of the rollers of the roller unit 230 is not substantially changed.

Figure 5:
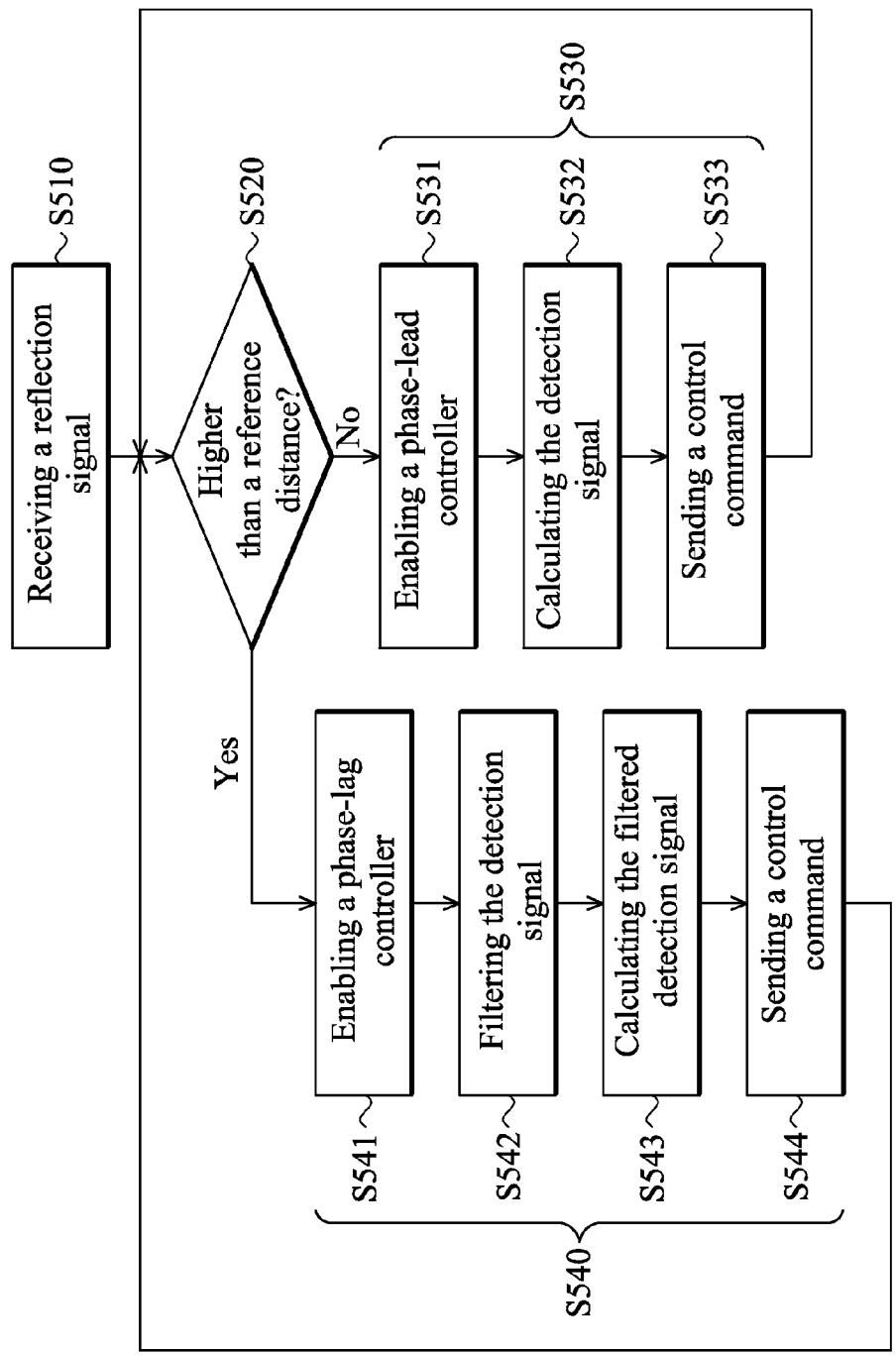
FIG. 5 is a schematic diagram of an exemplary embodiment of a control method of the invention.

FIG. 5 is a schematic diagram of an exemplary embodiment of a control method of the invention. The control method is utilized to control traveling route of a cleaning robot. First, the cleaning robot is activated to move along a wall and to receive a reflection signal (step S510). The invention does not limit the kind of the reflection signal. In one embodiment, the reflection signal is an ultrasonic wave signal.

It is determined whether the distance between the cleaning robot and the wall is larger than a reference distance (step S520). In this embodiment, the reflection signal is utilized to determine whether the distance between the cleaning robot and the wall is larger than a reference distance. For example, the reflection signal is transformed to a detection signal and then it is determined whether the detection signal is larger than a reference signal.

When the detection signal is less than or equal to the reference signal, it represents that the distance between the cleaning robot and the wall is not larger than a reference distance. Thus, a first control unit of the cleaning robot is enabled to control the traveling route of the cleaning robot such that the distance between the cleaning robot and the wall is equal to a first distance (step S530).

The invention does not limit how the distance between the cleaning robot and the wall is equal to a first distance. In this embodiment, when the detection signal is less than or equal to the reference signal, a phase-lead controller is enabled (step S531). In other embodiments, other controllers can replace the phase-lead controller to process the detection signal. The detection signal is calculated (step S532) and then a control command is sent according to the calculated result (step S533) such that the distance between the cleaning robot and the wall is equal to a first distance.

When the detection signal is larger than the reference signal, it represents that the distance between the cleaning robot and the wall is larger than a reference distance. Thus, a second control unit of the cleaning robot is enabled to control the traveling route of the cleaning robot such that the distance between the cleaning robot and the wall is equal to a second distance (step S540). In this embodiment, the second distance is larger than the first distance.

Similarly, the invention does not limit how the distance between the cleaning robot and the wall is equal to a second distance. In one embodiment, when the detection signal is larger than the reference signal, a phase-lag controller is enabled (step S541). In other embodiments, other controllers can replace the phase-lag controller to process the detection signal.

In this embodiment, the detection signal is filtered (step S542). In other embodiments, the detection signal is delayed. Then, the filtered detection signal is calculated by the phase-lag controller (step S543). A control command is sent according to the calculated detection signal (step S544) such that the distance between the cleaning robot and the wall is equal to a second distance.

The distance between a cleaning robot and a wall is automatically adjusted, so that the traveling route of the cleaning robot is smooth. For example, when the distance between the cleaning robot and the wall is less than a reference distance, a first control unit of the cleaning robot is enabled such that the distance between the cleaning robot and the wall is small. When the distance between the cleaning robot and the wall is larger than a reference distance, a second control unit of the cleaning robot is enabled such that the distance between the cleaning robot and the wall is larger. Since the traveling route of the cleaning robot is not substantially changed, the cleaning efficiency of the cleaning robot is increased.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cleaning robot, comprising:
    a roller unit comprising a plurality of rollers;
    a sensing unit receiving a reflection signal and generating a detection signal according to the reflection signal;
    a first control unit, wherein when the detection signal is less than or equal to a reference signal, the first control unit controls the traveling direction of the rollers according to the detection signal such that a distance between the cleaning robot and a wall is equal to a first distance; and
    a second control unit, wherein when the detection signal is larger than the reference signal, the second control unit controls the traveling direction of the rollers according to the detection signal such that a distance between the cleaning robot and a wall is equal to a second distance larger then the first distance.

2. The cleaning robot as claimed in claim 1, wherein the reflection signal is an ultrasonic wave.

3. The cleaning robot as claimed in claim 1, wherein the second control unit delays the detection signal and controls the rollers according to the delayed detection signal.

4. The cleaning robot as claimed in claim 1, wherein the first control unit comprises a phase-lead controller, and the second control unit comprises a phase-lag controller.

5. The cleaning robot as claimed in claim 4, wherein the second control unit comprises:
    a filter filtering the detection signal when the detection signal is larger than the reference signal, wherein the phase-lag controller controls the traveling direction of the rollers according to the filtered detection signal.

6. The cleaning robot as claimed in claim 5, wherein a cut-off frequency of the filter relates to the width of the cleaning robot.

7. The cleaning robot as claimed in claim 5, wherein the filter is an infinite impulse response (IIR) filter, a finite impulse response (FIR) filter, a Kalman filter or a particle filter.

8. The cleaning robot as claimed in claim 1, wherein the second control unit comprises a proportional-integral-derivative (PID) controller, a fuzzy controller or a learning controller.

9. A control method for controlling a cleaning robot comprising a first control unit and a second control unit, wherein traveling route of the cleaning robot is controlled by the first and the second control units, comprising:
    activating the cleaning robot to receive a reflection signal;
    generating a detection signal according to the reflection signal;
    when the detection signal is less than or equal to a reference signal, the first control unit is enabled such that the cleaning robot maintains a first distance with a wall; and
    when the detection signal is larger than the reference signal, the second control unit is enabled such that the cleaning robot maintains a second distance with the wall, wherein the second distance is larger than the first distance.

10. The control method as claimed in claim 9, wherein when the second control unit is enabled, the second control unit delays the detection signal and controls the cleaning robot according to the delayed detection signal such that the cleaning robot maintains the second distance with the wall.

11. The control method as claimed in claim 9, wherein when the second control unit is enabled, the second control unit filters the detection signal.

* * * * *